US012734907B2

(12) United States Patent
Takahashi et al.

(10) Patent No.: US 12,734,907 B2
(45) Date of Patent: Sep. 15, 2026

(54) ELECTRICALLY DRIVEN WORK MACHINE

(71) Applicant: Hitachi Construction Machinery Tierra Co., Ltd., Koka (JP)

(72) Inventors: Kiwamu Takahashi, Moriyama (JP); Natsuki Nakamura, Moriyama (JP); Noriyuki Iwasa, Koka (JP); Takeshi Ishii, Hino-cho (JP); Shohei Taniguchi, Koka (JP)

(73) Assignee: HITACHI CONSTRUCTION MACHINERY TIERRA CO., LTD., Koka (JP)

( * ) Notice: Subject to any disclaimer, the term of this patent is extended or adjusted under 35 U.S.C. 154(b) by 177 days.

(21) Appl. No.: 18/724,210

(22) PCT Filed: Dec. 26, 2022

(86) PCT No.: PCT/JP2022/047996
§ 371 (c)(1),
(2) Date: Jun. 26, 2024

(87) PCT Pub. No.: WO2023/188649
PCT Pub. Date: Oct. 5, 2023

(65) Prior Publication Data

US 2025/0058653 A1 Feb. 20, 2025

(30) Foreign Application Priority Data

Mar. 31, 2022 (JP) ................................ 2022-060775

(51) Int. Cl.
*B60L 50/60* (2019.01)
*E02F 9/08* (2006.01)
(Continued)

(52) U.S. Cl.
CPC ............ *B60L 50/60* (2019.02); *E02F 9/0866* (2013.01); *E02F 9/166* (2013.01); *E02F 9/207* (2013.01); *B60L 2200/40* (2013.01)

(58) Field of Classification Search
CPC ............ E02F 9/163; E02F 9/166; B60L 50/60
See application file for complete search history.

(56) References Cited

U.S. PATENT DOCUMENTS 5,520,500 A * 5/1996 McIlwain ............. E02F 3/3405 414/685
5,551,826 A * 9/1996 Todd .................... B62D 33/067 296/190.07

(Continued)

FOREIGN PATENT DOCUMENTS

JP 5-18932 U 3/1993
JP 11-234816 A 8/1999

(Continued)

OTHER PUBLICATIONS

International Preliminary Report on Patentability received in corresponding International Application No. PCT/JP2022/047996 dated Oct. 3, 2024.

(Continued)

*Primary Examiner* — Jeffrey J Restifo
(74) *Attorney, Agent, or Firm* — MATTINGLY & MALUR, PC

(57) ABSTRACT

There is provided an electrically driven work machine including an electric motor that is a prime mover, an inverter that controls the electric motor, a power feed system that supplies power to the inverter, a driving battery device that stores the power supplied from the power feed system and supplies the power to the inverter, a control battery that supplies power for control for the inverter, the power feed system, and the driving battery device, and an opening-closing cover that covers the power feed system. The (Continued)

electrically driven work machine includes a control power interruption device that interrupts supply of the power for control with respect to the inverter, the power feed system, and the driving battery device in conjunction with opening of the opening-closing cover.

5 Claims, 4 Drawing Sheets

(51) Int. Cl.
*E02F 9/16* (2006.01)
*E02F 9/20* (2006.01)

(56) References Cited

U.S. PATENT DOCUMENTS

| | | | | |
|---|---|---|---|---|
| 6,910,731 | B2 * | 6/2005 | Albright | B62D 33/071 296/190.05 |
| 7,162,816 | B2 * | 1/2007 | Otsuka | E02F 3/325 180/89.18 |
| 7,338,114 | B2 * | 3/2008 | Ishii | B62D 33/07 180/89.18 |
| 7,673,931 | B2 * | 3/2010 | Takano | B62D 33/0625 296/190.01 |
| 7,806,466 | B2 * | 10/2010 | Shurts | E02F 3/3414 180/89.18 |
| 7,900,996 | B2 * | 3/2011 | Kimura | E02F 9/163 296/190.09 |
| 8,096,608 | B2 * | 1/2012 | Andou | E02F 9/0833 180/89.18 |
| 8,464,819 | B2 * | 6/2013 | Major | E02F 3/283 180/89.12 |
| 9,045,882 | B2 * | 6/2015 | Major | E02F 3/283 |
| 9,139,980 | B2 * | 9/2015 | Huissoon | E02F 9/0875 |
| 9,193,396 | B2 * | 11/2015 | Davisdon | B62D 33/067 |
| 9,863,121 | B2 * | 1/2018 | Huissoon | E02F 9/0883 |
| 10,358,174 | B2 * | 7/2019 | Yamada | B66C 13/54 |
| 11,225,774 | B2 * | 1/2022 | Horii | B60N 2/12 |
| 11,339,553 | B2 * | 5/2022 | Mulligan | B62D 24/04 |
| 12,312,767 | B2 * | 5/2025 | Takaki | E02F 9/0891 |
| 12,365,401 | B2 * | 7/2025 | Roehlk | E02F 9/0808 |
| 12,473,714 | B2 * | 11/2025 | Takaki | E02F 9/0808 |
| 12,516,493 | B2 * | 1/2026 | Relph | E02F 3/3414 |
| 2012/0186889 | A1 | 7/2012 | Yoshida et al. | |
| 2020/0298713 | A1 | 9/2020 | Baumann et al. | |
| 2025/0058653 | A1 * | 2/2025 | Takahashi | E02F 9/207 |
| 2025/0206217 | A1 * | 6/2025 | Nakamura | E02F 9/166 |
| 2025/0346125 | A1 * | 11/2025 | Mallaun | H01M 50/249 |

FOREIGN PATENT DOCUMENTS

| | | |
|---|---|---|
| JP | 2005-207065 A | 8/2005 |
| JP | 2006-045955 A | 2/2006 |
| JP | 2011-246955 A | 12/2011 |
| JP | 2013-163946 A | 8/2013 |
| JP | 2022-047111 A | 3/2022 |

OTHER PUBLICATIONS

International Search Report of PCT/JP2022/047996 dated Feb. 21, 2023.

Chinese Office Action received in corresponding Chinese Application No. 202280085625.5 dated Jun. 19, 2026.

* cited by examiner

ELECTRICALLY DRIVEN WORK MACHINE

TECHNICAL FIELD

The present invention relates to an electrically driven work machine such as a hydraulic excavator.

BACKGROUND ART

There are construction machines such as hydraulic excavators to which consideration is given to allow easy execution of maintenance of parts such as hydraulic equipment and wiring lines disposed on the lower side of a cab, by making a configuration in such a manner that the cab can be tilted up relative to a swing frame. As this kind of construction machine, there is known one having a function of prohibiting operation of an engine and hydraulic actuators when tilt-up of a cab is sensed (patent document 1).

PRIOR ART DOCUMENT

Patent Document

Patent Document 1: JP-2006-45955-A

SUMMARY OF THE INVENTION

Problem to be Solved by the Invention

In recent years, fields of active use of electrically driven work machines have been widening, that do not emit an engine exhaust gas and also allow small noise, mainly at work sites in indoor, underground spaces, and the like. In the case of the electrically driven work machine, when exposing a maintenance target part through tilt-up of a cab or the like, for example, if a key switch is in the on-state, a reasonable voltage often remains in an electrical system even when a prime mover (electric motor) has been stopped. If maintenance is executed in such a state, attention needs to be paid to the remaining of the voltage. Thus, the work efficiency lowers.

An object of the present invention is to provide an electrically driven work machine that can sufficiently lower the voltage of an electrical system in maintenance.

Means for Solving the Problem

In order to achieve the above-described object, the present invention provides an electrically driven work machine including an electric motor that is a prime mover, an inverter that controls the electric motor, a power feed system that supplies power to the inverter, a driving battery device that stores the power supplied from the power feed system and supplies the power to the inverter, a control battery that supplies power for control for the inverter, the power feed system, and the driving battery device, and an opening-closing cover that covers the power feed system. The electrically driven work machine includes a control power interruption device that interrupts supply of the power for control with respect to the inverter, the power feed system, and the driving battery device in conjunction with opening of the opening-closing cover, a sensor that detects opening of the opening-closing cover, a base frame, a cab that includes an operation seat and is mounted on the base frame, a rotating shaft that joins the cab to the base frame and is disposed at a front part of the cab so as to allow a rear part of the cab to rise and lower, and a machinery room that is interposed between the base frame and the cab and houses the power feed system and the inverter. The cab is the opening-closing cover and is formed to tilt up and down with use of the rotating shaft as a fulcrum to open and close the machinery room. The sensor is disposed at a position closer to the rotating shaft with respect to the inverter and detects a tilted-up state of the cab. The control power interruption device interrupts supply of the power for control with respect to the inverter, the power feed system, and the driving battery device when tilt-up of the cab is detected by the sensor. The inverter is disposed at a rear part of the machinery room.

Advantages of the Invention

According to the present invention, the voltage of the electrical system can be sufficiently lowered in maintenance of the electrically driven work machine.

MODES FOR CARRYING OUT THE INVENTION

An embodiment of the present invention will be described below with use of the drawings.

1. Electrically Driven Work Machine

Figure 1:
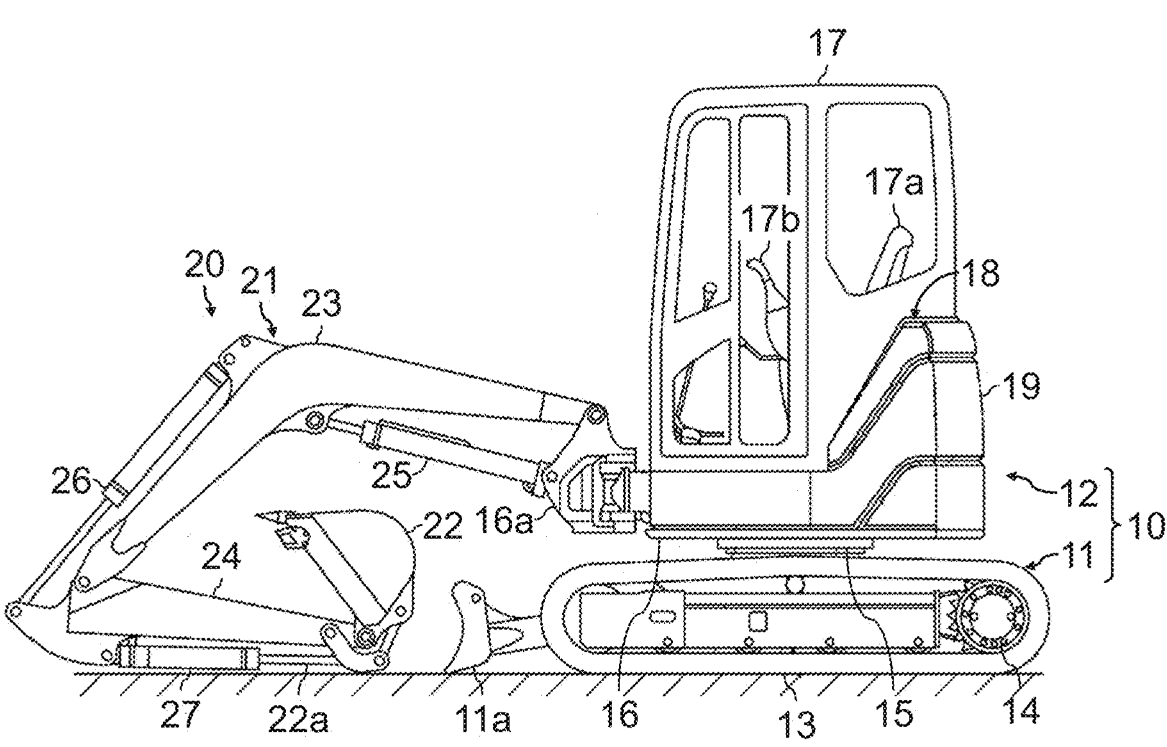
FIG. 1 is a side view of an electrically driven work machine according to one embodiment of the present invention.
Figure 2:
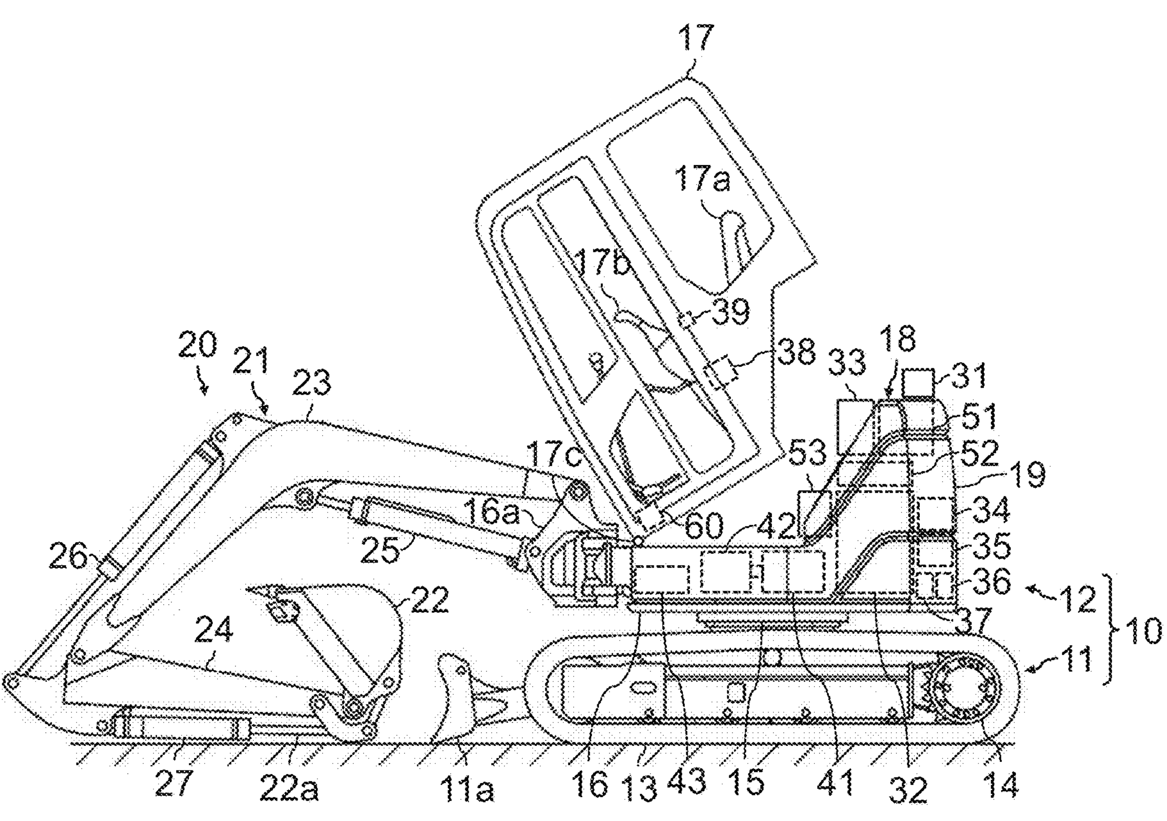
FIG. 2 is a diagram representing the state in which a cab of the electrically driven work machine of FIG. 1 is tilted.

FIG. 1 is a side view of an electrically driven work machine according to one embodiment of the present invention. FIG. 2 is a diagram representing the state in which a cab of the electrically driven work machine of FIG. 1 is tilted. Hereinafter, the direction in which an operator who sits on an operation seat is oriented (left direction in FIG. 1) is defined as the forward direction of a swing structure 12. Furthermore, although a hydraulic excavator will be described as one example of the electrically driven work machine in the present embodiment, the present invention can be applied also to other electrically driven work machines such as a wheel loader and a bulldozer.

The electrically driven work machine illustrated in FIG. 1 is a hydraulic excavator and includes a machine body 10 and a front work implement 20 joined to the machine body 10. The machine body 10 includes a track structure 11 and the swing structure 12.

—Track Structure—

The track structure 11 forms a base structural body of the electrically driven work machine and is a track structure of a crawler type including left and right crawlers 13. The left and right crawlers 13 are driven by left and right track drive devices 14, respectively. The track drive devices 14 are composed of a travelling motor (hydraulic motor) and a reducer. A blade (earth removal device) 11*a* is attached to a front part of a frame (track frame) of the track structure 11. The blade 11*a* is moved up and down by a blade cylinder (not illustrated). The swing structure 12 is disposed over the track structure 11 with the interposition of a swing circle 15. Driving the swing circle 15 by a swing motor (not illustrated) causes the swing structure 12 to swing around a vertical axis relative to the track structure 11. The swing motor is a hydraulic motor. When an electric motor is used, the hydraulic motor and the electric motor are used in combination in some cases. Note that the track structure 11 may be a wheel type although the track structure 11 of a crawler type is exemplified in the present embodiment.

—Swing Structure—

The swing structure 12 includes a swing frame 16, a cab (operation room) 17, an exterior cover 18, a counterweight 19, and the like.

The swing frame 16 is a base frame of the swing structure 12. This swing frame 16 is joined to the track structure 11 with the interposition of the swing circle 15. A swing post 16*a* is joined to a front part of the swing frame 16 with the interposition of a shaft (not illustrated) that vertically extends. The swing post 16*a* is oscillated left and right by a swing cylinder (not illustrated).

The cab 17 is mounted on the swing frame 16. In the cab 17, an operation seat 17*a* on which an operator sits, operation lever devices 17*b* operated by the operator, and the like are included. The operation lever devices 17*b* are, for example, electrical lever devices and are disposed on the left and right sides of the operation seat 17*a*. For example, instructions to execute the respective actions, i.e., boom lowering, boom raising, bucket crowding, and bucket dumping, are made when the lever of the right operation lever device 17*b* is tilted forward, backward, leftward, and rightward, respectively. Instructions to execute the respective actions, i.e., right swing, left swing, arm dumping, and arm crowding, are made when the lever of the left operation lever device 17*b* is tilted forward, backward, leftward, and rightward, respectively. Besides, the cab 17 is equipped with also a controller 38, a key switch 39, and the like.

The exterior cover 18 is interposed between the swing frame 16 and the cab 17 and forms a machinery room that surrounds instruments such as a power feed system 50 (FIG. 5), a power supply 31, an electric motor 41 (prime mover), a hydraulic pump 42, and a control valve 43, and houses these power feed system 50 and the like. Besides, a driving battery device 32, an inverter 33, a DC/DC converter 34, a control battery 35, a control power interruption device (controller relay) 36, and a key switch relay 37 are housed in the machinery room surrounded by the exterior cover 18. The power feed system 50 includes an AC box 51, a power conversion device 52, a junction box 53, and power transmission lines 54 and 55 (FIG. 5), and the like.

The counterweight 19 is a weight that maintains the weight balance with the front work implement 20 and is supported by the rear end of the swing frame 16.

—Front Work Implement—

The front work implement 20 is an articulated work device and is configured to include a work arm 21 and a bucket 22. The work arm 21 is configured with a boom 23, an arm 24, a boom cylinder 25, an arm cylinder 26, and a bucket cylinder 27. The boom cylinder 25, the arm cylinder 26, and the bucket cylinder 27 are all double-acting hydraulic cylinders and drive the front work implement 20. The boom cylinder 25 is disposed on the belly side of the boom 23. The arm cylinder 26 is disposed on the back side of the boom 23. The bucket cylinder 27 is disposed on the back side of the arm 24. The belly side is the lower side of the work arm 21 with a posture in which the tip of the arm 24 is oriented forward, and the back side is the upper side of the work arm 21 with the same posture.

The boom 23 is joined to the machine body 10 (swing post 16*a*) pivotally upward and downward with the interposition of a pin. The arm 24 is joined to the tip of the boom 23 pivotally forward and rearward with the interposition of a pin. The bucket 22 is pivotally joined to the tip of the arm 24 with the interposition of a pin. The bucket 22 is an attachment and can be replaced by another attachment such as a grapple.

In the boom cylinder 25, the base end thereof is joined to the machine body 10 (swing post 16*a*) and the tip thereof is joined to the boom 23. In the arm cylinder 26, the base end thereof is joined to the boom 23 and the tip thereof is joined to the arm 24. In the bucket cylinder 27, the base end thereof is joined to the arm 24 and the tip thereof is joined to the bucket 22 with the interposition of a bucket link 22*a*.

2. Tilt Mechanism

Figure 3:
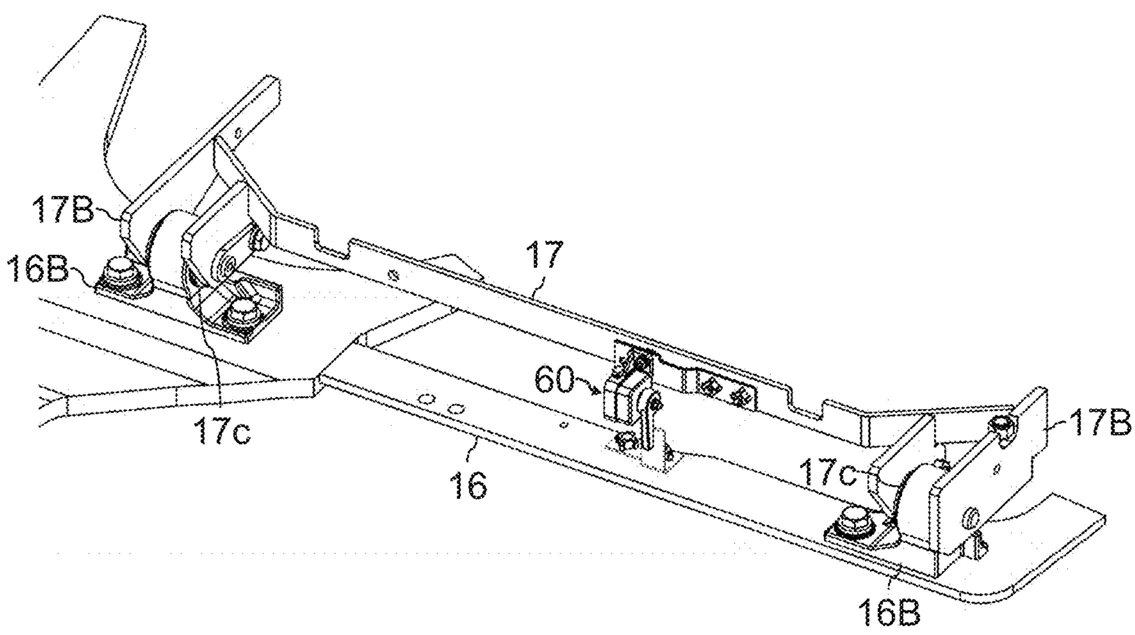
FIG. 3 is a diagram representing the major part of a tilt mechanism included in the electrically driven work machine of FIG. 1.
Figure 4:
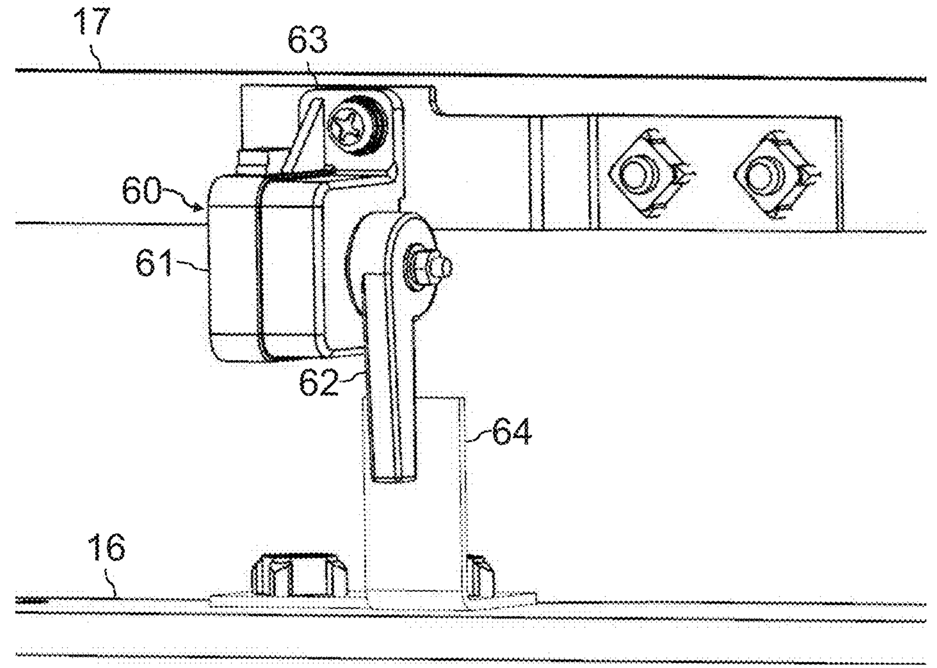
FIG. 4 is a configuration diagram of a sensor that senses a tilted-up state of the cab included in the electrically driven work machine of FIG. 1.

FIG. 3 is a diagram representing the major part of a tilt mechanism included in the electrically driven work machine of FIG. 1. FIG. 4 is a configuration diagram of a sensor that senses a tilted-up state of the cab. As illustrated in FIG. 3, the cab 17 is joined to the swing frame 16 with the interposition of rotating shafts 17*c* extending along the horizontal direction (in the present embodiment, left-right direction) and is configured to be capable of being vertically tilted with the rotating shafts 17*c* being fulcrums. In the present embodiment, the rotating shafts 17*c* are disposed on the same axis at left and right two places on a front part of the cab 17 and join brackets 16B and 17B disposed on the swing frame 16 and the cab 17, respectively. A rear part of the cab 17 rises and lowers with these rotating shafts 17*c* being fulcrums. FIG. 2, illustrated previously, represents the state in which the cab 17 is tilted up.

Through the tilt of the cab 17 with use of the rotating shafts 17*c* as the fulcrums in the above-described manner, an upper opening of the machinery room defined by the exterior cover 18 is opened and closed. As described above, various instruments such as the power feed system 50 are housed in the machinery room. The cab 17 doubles as an opening-closing cover that covers the respective instruments such as the power feed system 50 housed in the machinery room, by an operator seated above the exterior cover 18 closing the upper opening of the machinery room and covering the upper opening of the machinery room.

Note that the junction box 53, the inverter 33, and the like, which are expected to have many opportunities of maintenance in general, among the instruments housed in the machinery room are disposed in a rear area in the machinery room (that is, area that is on the opposite side to the rotating shafts 17*c* and opens wide vertically) (see FIG. 2). The positional relationship between the maintenance target instruments such as the junction box 53 and the inverter 33 and the rotating shafts 17*c* is set in such a manner that the worker easily accesses instruments involving a high frequency of maintenance in the state in which the cab 17 is tilted up as above.

Furthermore, the electrically driven work machine of the present embodiment is equipped with a sensor 60 that detects opening of the opening-closing cover that covers the power feed system 50 and the like, that is, that detects the tilted-up state of the cab 17. The sensor 60 is attached to the swing frame 16 or the cab 17 (in the present embodiment, to the cab 17) in such a manner as to be located in the vicinity of the rotating shaft 17*c* (at a position closer to the rotating shaft 17*c* with respect to the operation seat 17*a*) as viewed in the axial direction of the rotating shafts 17*c* of the cab 17. It suffices that the sensor 60 can detect change in the distance between two components, and the sensor 60 may be either a contact type or a contactless type. In the present embodiment, a configuration using one kind of limit switch as the sensor 60 is exemplified.

Specifically, the sensor 60 includes a body 61 and a lever 62. The body 61 houses a contact (for example, micro switch) and is fixed to the frame of the cab 17 with the interposition of a bracket 63. The lever 62 is pivotally attached to the body 61 and is configured to pivot relative to the body 61 to open and close the contact disposed inside the body 61. The pivot center of the lever 62 corresponds with (or substantially corresponds with) the center line of the rotating shafts 17*c* of the cab 17. In the present embodiment, a bracket 64 is attached to the swing frame 16 so as to face the rear side of the lever 62 of the sensor 60. The lever 62 of the sensor 60 is pressed against the bracket 64 by a spring (not illustrated) housed inside the body 61. In association with tilt-up or tilt-down of the cab 17, the lever 62 engages with the bracket 64 and pivots relative to the body 61 of the sensor 60. The contact of the sensor 60 is closed in the state of FIG. 4 (state in which the cab 17 is horizontal). When the cab 17 is tilted up (erected from the horizontal posture), the lever 62 rotates and the contact is opened. When the cab 17 is tilted down (laid into the horizontal posture from the erect posture), the contact of the sensor 60 is closed.

3. Electric Drive System

Figure 5:
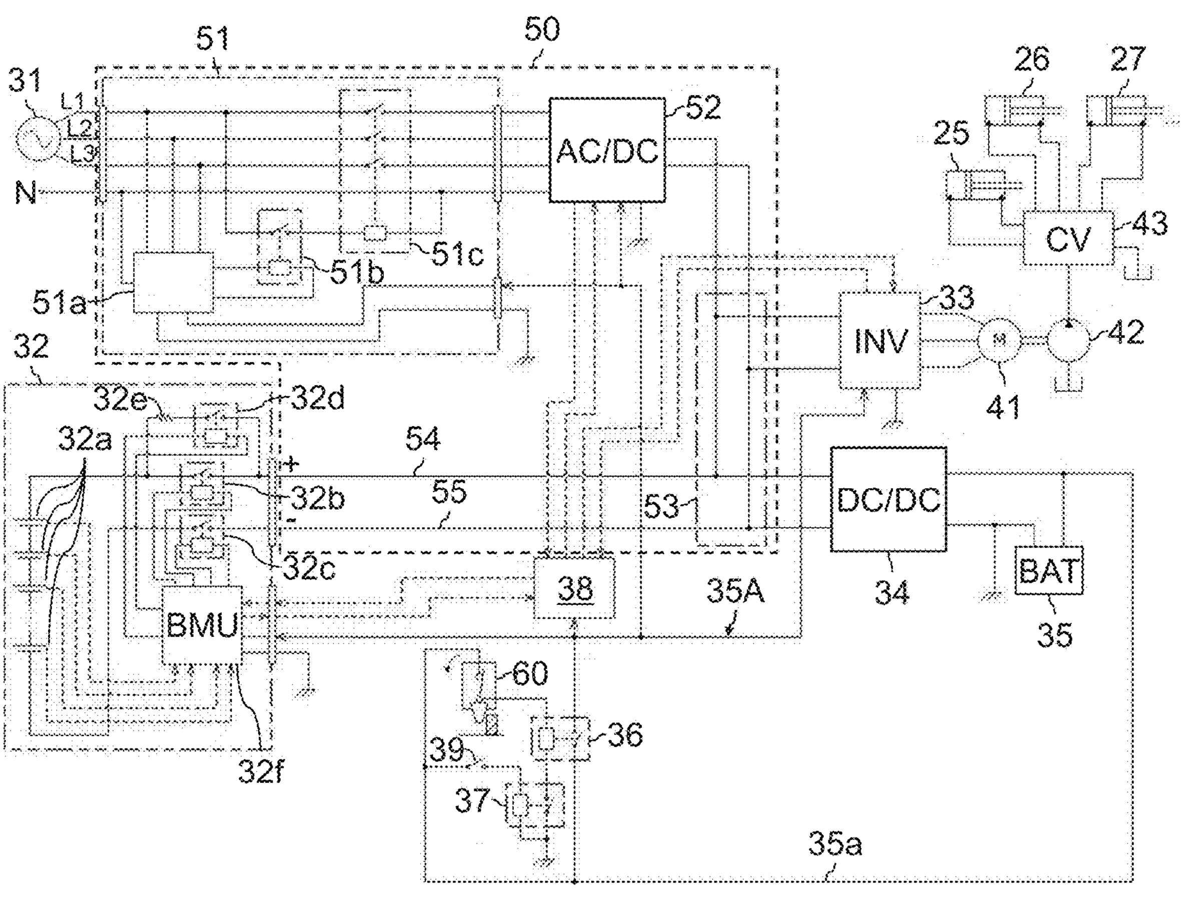
FIG. 5 is a circuit diagram of the major part of an electric drive system of the electrically driven work machine of FIG. 1.

FIG. 5 is a circuit diagram of the major part of an electric drive system of the electrically driven work machine of the present embodiment. The electric drive system includes the inverter 33, the driving battery device 32, the power feed system 50, the controller 38, the control battery 35, the control power interruption device 36, and the like.

—Inverter—

The inverter 33 controls the revolution speed of the electric motor 41. The electric motor 41 is a prime mover of a hydraulic system that drives hydraulic actuators such as the boom cylinder 25 and drives the hydraulic pump 42. A hydraulic fluid delivered from the hydraulic pump 42 is supplied to the hydraulic actuators through the control valve 43 and drives the hydraulic actuators. In the hydraulic actuators driven by the hydraulic fluid delivered by the hydraulic pump 42, besides the boom cylinder 25, the arm cylinder 26, and the bucket cylinder 27, the swing motor, the swing cylinder, the travelling motors, and the blade cylinder are included although not illustrated.

—Driving Battery Device—

The driving battery device 32 is connected to the power feed system 50, the inverter 33, and the control battery 35 through the power transmission lines 54 and 55. The driving battery device 32 stores power supplied from the power feed system 50 and supplies the stored power to the inverter 33 and the control battery 35. The driving battery device 32 includes a plurality of battery modules 32*a*, battery relays 32*b* and 32*c*, a pre-charge relay 32*d*, a pre-charge resistor 32*e*, a BMU 32*f*, and the like.

The positive terminal and the negative terminal of the battery modules 32*a* are connected to the power transmission lines 54 and 55 through the battery relays 32*b* and 32*c*, respectively. The positive terminal of the battery module 32*a* and the power transmission line 54 are disconnected and connected by opening and closing of a contact of the battery relay 32*b*. Similarly, the negative terminal of the battery module 32*a* and the power transmission line 55 are disconnected and connected by opening and closing of a contact of the battery relay 32*c*. The pre-charge relay 32*d* and the pre-charge resistor 32*e* play a role in preventing the flow of an excessive current through the power transmission lines 54 and 55 when the contacts of the battery relays 32*b* and 32*c* are closed. The pre-charge relay 32*d* and the battery relays 32*b* and 32*c* are opened and closed by a control signal from the BMU 32*f*. The BMU 32*f* transmits monitoring data of the voltage, the temperature, and the like of each battery module 32*a* to the controller 38, and outputs the control signal to the pre-charge relay 32*d* and the battery relays 32*b* and 32*c* in accordance with a command that is received from the controller 38 and is based on the monitoring data.

—Power Feed System—

The power feed system 50 supplies power supplied from the power supply 31 to the inverter 33, the driving battery device 32, and the control battery 35 through the power transmission lines 54 and 55. In the present embodiment, a configuration using a three-phase AC power supply mounted in the machine as the power supply 31 is exemplified. The power supplied to the driving battery device 32 and the control battery 35 is stored in the driving battery device 32 and the control battery 35, respectively. The power supplied to the inverter 33 drives the inverter. As described above, the power feed system 50 includes the AC box 51, the power conversion device 52, the junction box 53, the power transmission lines 54 and 55, and the like.

The AC box 51 is disposed on a path that introduces the three phases (L1, L2, and L3 phases) of the power supply 31 and a neutral line N to the power conversion device 52. In the power feed system 50, the power of the power supply 31 supplied through the AC box 51 is converted from an AC (alternating current) to a DC (direct current) by the power conversion device 52 and is output through the junction box 53.

The AC box 51 includes a voltage monitoring device 51*a*, a voltage monitoring relay 51*b*, and a power supply relay 51*c*. The voltage monitoring device 51*a* monitors the respective voltages between the L1, L2, and L3 phases and the neutral line N. The voltage monitoring device 51*a* operates by using, as a power supply, power from the control battery 35 supplied through the control power interruption device 36. In the voltage monitoring relay 51*b*, a contact is closed when power is supplied to the voltage monitoring device 51*a* and the output of the voltage monitoring device 51*a* is normal. The contact of the voltage monitoring relay 51*b* opens when power is not supplied to the voltage monitoring device 51*a* or when the output of the voltage monitoring device 51*a* is abnormal.

The power supply relay 51*c* has three contacts disposed on the respective power supply routes of the L1, L2, and L3 phases that supply power from the power supply 31 to the power conversion device 52, and the power supply relay 51*c* opens and closes the three contacts to disconnect and connect the power supply routes that link the power supply 31 to the power conversion device 52. A coil of the power supply relay 51*c* is connected in series to any one phase (in the present embodiment, L1 phase) of the L1, L2, and L3 phases of the power supply 31 through the contact of the voltage monitoring relay 51*b*. In the state in which the contact of the voltage monitoring relay 51*b* is closed (when the voltage monitoring device 51*a* is energized and the output of the voltage monitoring device 51*a* is normal), the contacts of the power supply relay 51*c* are closed and power is supplied from the AC box 51 to the power conversion device 52. In the state in which the contact of the voltage monitoring relay 51*b* is open (when the voltage monitoring device 51*a* is not energized or when the output of the voltage monitoring device 51*a* is abnormal), the contacts of the power supply relay 51*c* open and the power supply from the AC box 51 to the power conversion device 52 is interrupted.

The power conversion device 52 converts the power supplied from the power supply 31 through the AC box 51 from the AC (alternating current) to the DC (direct current) and outputs the DC power to the power transmission lines 54 and 55. The power output from the power conversion device 52 to the power transmission lines 54 and 55 is distribute through the junction box 53 and is supplied to the inverter 33, the driving battery device 32, and the control battery 35. The power supplied to the driving battery device 32 and the control battery 35 is stored in the driving battery device 32 and the control battery 35, respectively. The power supplied to the inverter 33 drives the inverter.

—Control Battery—

The control battery 35 is connected to the power transmission lines 54 and 55 through the DC/DC converter 34 and is connected to the controller 38, the inverter 33, the driving battery device 32, and the power feed system 50 through a control power supply circuit 35A. In the control power supply circuit 35A, a main line 35*a* leading to the control battery 35 and the DC/DC converter 34 is wired so as to branch into a plurality of branch lines. The respective branch lines of the control power supply circuit 35A are connected to the controller 38, the inverter 33, the driving battery device 32 (BMU 32*f*), and the power feed system 50 (voltage monitoring device 51*a* and power conversion device 52).

Therefore, power supplied through the power feed system 50 or the driving battery device 32 is stepped down by the DC/DC converter 34, and the stepped-down power is supplied to the control battery 35 and is then stored. The power stored in the control battery 35 is output to the control power supply circuit 35A, and is then used as power for control for the controller 38, the inverter 33, the driving battery device 32, and the power feed system 50.

—Controller—

The controller 38 is connected to the inverter 33, the driving battery device 32 (BMU 32*f*), and the power feed system 50 (power conversion device 52) by control lines. The controller 38 operates by the power for control from the control battery 35 and controls the inverter 33 and the power feed system 50 (power conversion device 52) on the basis of data input from the driving battery device 32 (BMU 32*f*).

—Control Power Interruption Device—

The control power interruption device 36 interrupts the supply of the power for control with respect to the inverter 33, the driving battery device 32, and the power feed system 50 in conjunction with opening of the cab 17 as the opening-closing cover that covers the power feed system 50 and the like.

In the present embodiment, the control power interruption device 36 is a relay disposed on the main line 35*a* of the control power supply circuit 35A (at a part closer to the control battery 35 with respect to the respective branch lines leading to the inverter 33, the power feed system 50, the driving battery device 32, and the controller 38). In the control power interruption device 36, a contact is disposed on the main line 35*a* of the control power supply circuit 35A, and an electrical line introduced from the main line 35*a* is connected to one end of a coil through the sensor 60. The other end of the coil of the control power interruption device 36 is grounded (earthed) through the key switch relay 37. A contact of the key switch relay 37 is closed when the key switch 39 is in the on-state, and is open when the key switch 39 is in the off-state.

4. Operation (a) At the Time of Operation or the Like

At the time of operation, the key switch 39 is turned ON in the state in which the cab 17 is horizontally laid (state in which the cab 17 is not tilted up). When the cab 17 is horizontal and the key switch 39 is ON, the contacts of the sensor 60 and the key switch relay 37 are both closed and the contact of the control power interruption device 36 is closed through reception of power from the control power supply circuit 35A by the coil. This energizes electrical parts such as the controller 38, the inverter 33, the driving battery device 32 (BMU 32*f*), and the power feed system 50 (voltage monitoring device 51*a* and power conversion device 52), and these electrical parts are activated.

In the driving battery device 32, the contacts of the pre-charge relay 32*d* and the battery relays 32*b* and 32*c* are sequentially switched from the opening position to the closing position by the BMU 32*f*, and power stored in the driving battery device 32 is supplied to the power transmission lines 54 and 55. Thereafter, when a set time settled in advance has elapsed from the switching of the battery relays 32*b* and 32*c* to the closing position, the pre-charge relay 32*d* is switched to the opening position by the BMU 32*f*.

In the AC box 51, the contact of the voltage monitoring relay 51*b* is switched from the opening position to the closing position by the voltage monitoring device 51*a*, and a current flows through the coil of the power supply relay 51*c* from one phase (in the example of FIG. 5, L1 phase) in the three phases of the power supply 31. Due to this, the contact of the power supply relay 51*c* is closed, and alternating-current power is supplied from the power supply 31 to the power conversion device 52 through the AC box 51.

Moreover, in the power conversion device 52, the power supplied from the power supply 31 through the AC box 51 is converted from the AC (alternating current) to the DC (direct current) and is output to the power transmission lines 54 and 55. The power on the power transmission lines 54 and 55 is introduced as appropriate to the inverter 33, the DC/DC converter 34, and the driving battery device 32 through the junction box 53. The power supplied to the DC/DC converter 34 is stepped down and is supplied to the control battery 35.

Furthermore, the inverter 33 receives the power from the control power supply circuit 35A by a control circuit, and controls the power supplied through the junction box 53 to control the revolution speed of the electric motor 41. The hydraulic pump 42 is driven by the electric motor 41, and the hydraulic fluid delivered from the hydraulic pump 42 is supplied to the hydraulic actuators such as the boom cylinder 25 through the control valve 43, so that these hydraulic actuators operate.

(b) At the Time of Maintenance or the Like

For example, when the cab 17 is tilted up for maintenance of the power feed system 50 (junction box 53), the inverter 33, and the like, the contact of the sensor 60 opens. Thus, irrespective of whether the key switch 39 is ON or OFF, the supply of power from the control power supply circuit 35A is interrupted and the contact of the control power interruption device 36 opens through demagnetization of the coil. This interrupts all of the supply of power to electrical parts such as the controller 38, the inverter 33, the driving battery device 32 (BMU 32*f*), and the power feed system 50 (voltage monitoring device 51*a* and power conversion device 52), and these electrical parts all stop.

In the driving battery device 32, due to the operation stop of the BMU 32*f*, the contacts of the pre-charge relay 32*d* and the battery relays 32*b* and 32*c* all open, and the connection between the driving battery device 32 and the power transmission lines 54 and 55 is interrupted.

In the AC box 51, the contact of the voltage monitoring relay 51*b* opens due to the operation stop of the voltage monitoring device 51*a*. In association with this, the contact of the power supply relay 51*c* also opens and the supply of the alternating-current power to the power conversion device 52 is interrupted. This interrupts also the connection between the power supply 31 and the power transmission lines 54 and 55.

As above, the connection between the power transmission lines 54 and 55 and the power supply 31 and the driving battery device 32 is interrupted, and the supply of power to the inverter 33 also stops. Moreover, the inverter 33 itself also stops due to the interruption of the connection to the control power supply circuit 35A. The electric motor 41, the hydraulic pump 42, and the hydraulic actuators also stop. Furthermore, the supply of power from the power transmission lines 54 and 55 to the DC/DC converter 34 and hence the control battery 35 also stops.

As described above, the control power interruption device 36 is configured to interrupt the supply of the power for control with respect to the inverter 33, the driving battery device 32, and the power feed system 50 when opening of the cab 17 is detected by the sensor 60. In particular, in the present embodiment, the control power interruption device 36 is configured by a relay, and the contact opens when opening of the cab 17 is detected by the sensor 60. This contact is disposed on the main line 35*a* of the control power supply circuit 35A, and the supply of the power for control not only to the inverter 33, the driving battery device 32, and the power feed system 50 but also to the controller 38 is interrupted.

Note that, when the key switch 39 is OFF, the contact of the key switch relay 37 is open, and therefore the contact of the control power interruption device 36 is open irrespective of whether or not the cab 17 is tilted up. The circuit operation based on the opening of the contact of the control power interruption device 36 is similar to that in the case in which the cab 17 is tilted up.

5. Effects (1) In the present embodiment, due to the disposing of the control power interruption device 36, if the cab 17 is tilted up (opened), the supply of the power for control to the inverter 33, the driving battery device 32, and the power feed system 50 is interrupted irrespective of whether the key switch 39 is ON or OFF. Due to this, the electric motor 41 and the hydraulic pump 42 stop and all hydraulic actuators stop. In addition, the voltage of electrical instruments including the power feed system 50 drops.

Thus, even if a worker opens the cab 17 without turning OFF the key switch 39, the electric drive system surely stops, and power is not supplied to the power transmission lines 54 and 55. Thus, the voltage of the electrical system can be sufficiently lowered in the case of checking or repairing an instrument relating to the electric drive system in maintenance of the electrically driven work machine.

(2) The control power interruption device 36 interrupts the supply of the power for control to the inverter 33, the driving battery device 32, and the power feed system 50, in association with detection of opening of the cab 17 by the sensor 60. For example, it is also possible to make a configuration in which the contact of the control power interruption device 36 works in conjunction with the cab 17 mechanically, and the contact opens in direct conjunction with tilt-up of the cab 17. However, in this case, the layout and the like of the contact of the control power interruption device 36 are restricted. In contrast, in the present embodiment, by employing the configuration in which the sensor 60 that detects tilt-up of the cab 17 is disposed and the power for control is interrupted in response to the output of this sensor 60, the flexibility of the design can be ensured and the instrument layout can be flexibly changed.

However, the sensor 60 can be omitted as appropriate in terms of achievement of the essential above-described effect (1). For example, in the case in which no trouble is caused in the layout design even with a configuration in which the contact of the control power interruption device 36 is opened and closed in direct conjunction with the cab 17 mechanically, it is also possible to employ, as the control power interruption device 36, the contact that works in conjunction with the cab 17 mechanically without the interposition of the sensor 60.

(3) Furthermore, the following configuration is employed. The contact of the control power interruption device 36 is disposed in the control power supply circuit 35A, and the supply of the power for control to the driving battery device 32, the inverter 33, and the power feed system 50 is cut off by interrupting the control power supply circuit 35A when the cab 17 is tilted up. The power for control supplied to each electrical instrument can be interrupted without relying on control by the controller 38 as above. Therefore, even if an abnormality has occurred in the controller 38, the power for control supplied to each electrical instrument such as the power feed system 50 can be surely interrupted. By employing the configuration in which the power for control supplied to each electrical instrument such as the power feed system 50 is interrupted independent of the controller 38, the controller 38 itself can also be stopped when the cab 17 is tilted up. Thus, the contact of the control power interruption device 36 can be disposed on the main line 35*a* of the control power supply circuit 35A, and the power for control can be rationally controlled by the single contact.

However, the configuration relating to effect (3) is not indispensable in terms of achievement of the above-described effect (1). For example, in the case of ensuring operation of part of electrical instruments, such as a warning lamp, during tilt-up of the cab 17, it is also possible to employ a configuration in which the power for control is supplied to electrical instruments such as the power feed system 50 through the controller 38, and the controller 38 controls the voltage for control in response to the output of the sensor 60. Alternatively, it is also possible to employ a configuration in which the contact of the control power interruption device 36 is individually disposed not on the main line 35*a* of the control power supply circuit 35A but on the each branch line leading to the electrical instrument regarding which the supply of the power for control should be interrupted, and the supply of the power for control to the controller 38 and to the necessary instrument is ensured.

(4) In the present embodiment, the machinery room can be opened wide by tilting up the cab 17, and allowing the cab 17 to double as the check cover can achieve both size reduction of the machine body and convenience of maintenance. In such a configuration, the worker inevitably lifts up the cab 17 when opening the machinery room in maintenance of electrical instruments such as the power feed system 50 and the inverter 33. In the present embodiment, the supply of power to electrical instruments such as the power feed system 50 can be rationally interrupted in the light of this inevitable procedure of the worker.

Note that, although the configuration in which tilt-up of the cab 17 is detected and the power for control is interrupted is employed in the present embodiment, the opening-closing cover regarding which opening is detected can be changed as appropriate depending on the configuration of the electrically driven work machine. In the present embodiment, for example, it is also conceivable to make a configuration in which opening of a cover of the junction box 53 (including a partition that separates the junction box 53) is detected and the power for control is interrupted. In this case, it is possible to employ a configuration that uses a limit switch or proximity sensor, and opening of the opening-closing cover is detected through separation of the cover of the junction box 53 from the main body. Besides, also in hydraulic excavators and other electrically driven work machines that do not employ a lift-up mechanism for a cab, it is possible to employ a configuration in which a sensor detects opening of an opening-closing cover of a maintenance port used for check and the like of electrical instruments, and the power for control is interrupted.

(5) The sensor 60 is located near the rotating shaft 17*c* of the cab 17. Therefore, the frontage of a space near the sensor 60 can be kept small even when the cab 17 is tilted up, and the sensor 60 can be protected. Therefore, it is possible to suppress the occurrence of the situation in which a worker gets contact with the sensor 60 by a tool or the like to cause breakage or a malfunction of the sensor 60 during maintenance of the junction box 53, the inverter 33, or the like.

Note that the position of the sensor 60 is not necessarily limited in terms of achievement of the essential above-described effect (1). For example, lift-up of the cab 17 can be detected even with a configuration in which a sensor (limit switch, proximity sensor, or the like) that detects separation or distance between two components is employed as the sensor 60 and is installed on the opposite side to the rotating shaft 17*c* with respect to the operation seat 17*a*. Even when such a configuration is employed, the configuration in which the power for control is interrupted in association with lift-up of the cab 17 can be made, and the above-described effect (1) can be obtained.

Furthermore, in the present embodiment, exemplification has been made about the configuration in which the rotating shafts 17*c* are laid out on the front side of the cab 17 and the rear part side of the cab 17 moves up and down with the rotating shafts 17*c* being fulcrums. However, the opening-closing direction of the cab 17 is not limited thereto. For example, it is also possible to employ a configuration in which the rotating shafts 17*c* are disposed at a left side part, a right side part, or a rear part of the cab 17, and the right side part, the left side part, or a front part of the cab 17 moves up and down.

DESCRIPTION OF REFERENCE CHARACTERS

16: Swing frame (base frame)
17: Cab (opening-closing cover)
17*c*: Rotating shaft
18: Exterior cover (machinery room)
32: Driving battery device
33: Inverter
35: Control battery
36: Control power interruption device
38: Controller
41: Electric motor
50: Power feed system
60: Sensor

The invention claimed is:

1. An electrically driven work machine comprising:

an electric motor that is a prime mover;

an inverter that controls the electric motor;

a power feed system that supplies power to the inverter;

a driving battery device that stores the power supplied from the power feed system, and supplies the power to the inverter;

a control battery that supplies power for control for the inverter, the power feed system, and the driving battery device; and an opening-closing cover that covers the power feed system, wherein the electrically driven work machine includes a control power interruption device that interrupts supply of the power for control with respect to the inverter, the power feed system, and the driving battery device in conjunction with opening of the opening-closing cover;

a sensor that detects opening of the opening-closing cover, a base frame, a cab that includes an operation seat and is mounted on the base frame, a rotating shaft that joins the cab to the base frame and is disposed at a front part of the cab so as to allow a rear part of the cab to rise and lower, and a machinery room that is interposed between the base frame and the cab, and houses the power feed system and the inverter, the cab is the opening-closing cover and is formed to tilt up and down with use of the rotating shaft as a fulcrum to open and close the machinery room, the sensor is disposed at a position closer to the rotating shaft with respect to the inverter and detects a tilted-up state of the cab, the control power interruption device interrupts supply of the power for control with respect to the inverter, the power feed system, and the driving battery device when tilt-up of the cab is detected by the sensor, and the inverter is disposed at a rear part of the machinery room.

2. The electrically driven work machine according to claim 1, wherein the control power interruption device is a relay disposed in a control power supply circuit that connects the inverter, the power feed system, and the driving battery device to the control battery, and the relay is formed in such a manner that a contact opens in association with detection of opening of the opening-closing cover, the detection being performed by the sensor.

3. The electrically driven work machine according to claim 2, wherein the electrically driven work machine includes a controller that is operated by the power for control from the control battery and that controls the inverter and the power feed system, the relay interrupts supply of the power for control with respect to the controller when opening of the opening-closing cover is detected by the sensor.

4. The electrically driven work machine according to claim 1, wherein the sensor is disposed at a position closer to the rotating shaft with respect to the operation seat.

5. The electrically driven work machine according to claim 1, wherein the sensor includes a body that is fixed to the cab and internally has a contact, and a lever that pivots relative to the body to open and close the contact, the sensor detects the tilted-up state of the cab on a basis of a state of the contact, and a bracket that faces a rear side of the lever in such a manner as to be capable of abutting against the rear side of the lever is attached to the base frame.

* * * * *